(12) United States Patent
Yan

(10) Patent No.: US 10,212,363 B2
(45) Date of Patent: Feb. 19, 2019

(54) PICTURE PROCESSING METHOD AND ELECTRONIC DEVICE

(71) Applicant: ZTE CORPORATION, Shenzhen (CN)

(72) Inventor: Guoqi Yan, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 59 days.

(21) Appl. No.: 15/321,168

(22) PCT Filed: Oct. 30, 2014

(86) PCT No.: PCT/CN2014/089902
§ 371 (c)(1),
(2) Date: Dec. 21, 2016

(87) PCT Pub. No.: WO2015/196681
PCT Pub. Date: Dec. 30, 2015

(65) Prior Publication Data
US 2017/0163904 A1    Jun. 8, 2017

(30) Foreign Application Priority Data
Jun. 24, 2014    (CN) .......................... 2014 1 0290250

(51) Int. Cl.
*H04N 5/262*    (2006.01)
*H04N 5/232*    (2006.01)
(Continued)

(52) U.S. Cl.
CPC ......... *H04N 5/2621* (2013.01); *G06T 7/0002* (2013.01); *H04N 1/2125* (2013.01);
(Continued)

(58) Field of Classification Search
CPC ........... H04N 5/23222; H04N 5/23293; H04N 5/2621; H04N 1/2125; H04N 1/2166
See application file for complete search history.

(56) References Cited

U.S. PATENT DOCUMENTS 6,535,636 B1    3/2003    Savakis et al.
7,944,483 B2    5/2011    Zhang
(Continued)

FOREIGN PATENT DOCUMENTS

CN    101179659        5/2008
CN    102375649 A      3/2012
(Continued)

OTHER PUBLICATIONS

International Search Report for PCT/CN2014/089902, English Translation attached to original, Both completed by the Chinese Patent Office dated Mar. 16, 2015, All together 5 Pages.
(Continued)

*Primary Examiner* — Abdelaaziz Tissire
(74) *Attorney, Agent, or Firm* — Plumsea Law Group, LLC

(57) ABSTRACT

A picture processing method and an electronic device are described. The method includes: adding a focus coordinate corresponding to a picture into exchangeable image file (EXIF) information corresponding to the picture when the picture is collected, so as to obtain extended EXIF information; determining a main area of the picture according to the extended EXIF information; calculating an average acutance value corresponding to the main area, and detecting number of noise points in the main area; and calculating to obtain a quality parameter corresponding to the picture by using the average acutance value and the number of noise points, and storing or displaying the picture according to the quality parameter.

8 Claims, 3 Drawing Sheets

(51) Int. Cl.
*H04N 5/77* (2006.01)
*G06T 7/00* (2017.01)
*H04N 1/21* (2006.01)

(52) U.S. Cl.
CPC ....... *H04N 1/2166* (2013.01); *H04N 5/23222* (2013.01); *H04N 5/23293* (2013.01); *H04N 5/772* (2013.01); *G06T 2207/30168* (2013.01)

(56) References Cited

U.S. PATENT DOCUMENTS

| | | | | |
|---|---|---|---|---|
| 8,081,227 | B1* | 12/2011 | Kim | H04N 17/002 348/211.3 |
| 2004/0119874 | A1* | 6/2004 | Imai | H04N 1/32128 348/362 |
| 2004/0119875 | A1* | 6/2004 | Hayaishi | G06T 7/0002 348/362 |
| 2004/0234153 | A1* | 11/2004 | Nakami | G06T 5/009 382/254 |
| 2005/0089246 | A1* | 4/2005 | Luo | G06K 9/00268 382/286 |
| 2006/0153471 | A1* | 7/2006 | Lim | H04N 5/23212 382/255 |
| 2007/0053557 | A1 | 3/2007 | Cahill et al. | |
| 2009/0116713 | A1* | 5/2009 | Yan | G06K 9/4619 382/128 |
| 2014/0085507 | A1* | 3/2014 | Pillman | G06T 5/004 348/231.99 |

FOREIGN PATENT DOCUMENTS

| | | |
|---|---|---|
| CN | 102867179 | 1/2013 |
| CN | 103826064 | 5/2014 |
| CN | 104113687 | 10/2014 |
| JP | 4396766 | 1/2010 |

OTHER PUBLICATIONS

Extend European Search Report for EP 14896009.9, completed by the European Patent Office dated Jun. 8, 2017 All together 8 Pages.
European Office Action dated Nov. 27, 2018 for EP Application No. 14896009.9 (9 pp.)

* cited by examiner

PICTURE PROCESSING METHOD AND ELECTRONIC DEVICE

CROSS-REFERENCE TO RELATED APPLICATION

This application is the U.S. national phase of PCT Appln. No. PCT/CN2014/089902 filed Oct. 30, 2014 which claims priority to Chinese Application No. 201410290250.3 filed Jun. 24, 2014, the disclosures of which are incorporated in their entirety by reference herein.

TECHNICAL FIELD

The present document relates to an image processing technology in the field of communication, and in particular to a picture processing method and an electronic device.

BACKGROUND

With the increasing development of the intelligent phones, the performance and experience of the camera have been greatly improved. In recent years, the popularity of the intelligent terminals and convenience of shooting by the camera enable more and more users to be accustomed to use the camera of the mobile phone to take photos of life, and instantly record some scenes in the life. In the using process, with the increase of time, the user often takes hundreds or even thousands of photos. How to allow the user to quickly select the photos that he/she wants to browse from the mass of photos becomes a problem required to pay attention to.

Google native Camera Gallery provides experience of classifying photos according to time and place. But in fact, the browsing experience individually from the time and place classification cannot meet the requirement of the user. On the other hand, because most of the users shooting by using the mobile phones are not professionals, limited by the shooting skills and shooting at any time, it is unable to guarantee that the quality of every photo is the best. For example, in the mobile scene, it is easy to shoot blurry photos because of not focusing. When shooting outdoors, it is very easy to shoot the overexposed and noised pictures because of the weather and light. The user generally wants to first browse better photos shot by himself/herself when browsing the photos. In addition, the user always views one photo to check whether it is satisfied after shooting the photo, and then adjusts the scene to shoot a next photo. In individual cases, the user continuously shoots a group of photos, and then deletes the photos which are not satisfied therein through filtering and viewing one by one. Usually browsing a group of similar photos one by one will consume the certain time and energy of the user.

SUMMARY

In order to solve the above technical problem, the objective of the embodiment of the present document is to provide a picture processing method and an electronic device.

The embodiment of the present document provides a picture processing method, includes:

adding a focus coordinate corresponding to a picture into exchangeable image file (EXIF) information corresponding to the picture when the picture is collected, to obtain extended EXIF information;

determining a main area of the picture according to the extended EXIF information;

calculating an average acutance value corresponding to the main area, and detecting number of noise points in the main area; and calculating to obtain a quality parameter corresponding to the picture by using the average acutance value and the number of noise points, and storing or displaying the picture according to the quality parameter.

In the above scheme, the above method further includes: obtaining a specified focus coordinate; or setting a central coordinate of the picture as the focus coordinate.

In the above scheme, the calculating to obtain a quality parameter corresponding to the picture by using the average acutance value and the number of noise points includes:

converting the average acutance value into an acutance score value, converting the number of the noise points into a noise point score value, determining a corresponding weighting factor according to the extended EXIF information, and calculating to obtain the quality parameter corresponding to the picture by using the weighting factor, the acutance score value and the noise point score value.

In the above scheme, the determining a corresponding weighting factor according to the extended EXIF information includes: extracting a flashlight parameter in the extended EXIF, and the weighting factor being a first group of weighting factors when determining that a flashlight is not turned on according to the flashlight parameter; otherwise, the weighting factor being a second group of weighting factors.

In the above scheme, the above method further includes: grading the picture according to the quality parameter, to obtain a grade corresponding to the picture;

accordingly, storing the picture according to the quality parameter being that: storing the quality parameter, by taking an identification of the picture as an index, into a database; or, storing the quality parameter and the grade of the picture, by taking the identification of the picture as the index, into the database; and the displaying the picture according to the quality parameter being that: displaying the picture in accordance with the quality parameter or the grade of the picture when the picture is displayed.

The embodiment of the present document further provides an electronic device, includes:

a processing unit, arranged to: add a focus coordinate corresponding to a picture into exchangeable image file (EXIF) information corresponding to the picture when the picture is collected, to obtain extended EXIF information; determine a main area of the picture according to the extended EXIF information; and store or display the picture according to the quality parameter; and a calculation unit, arranged to: calculate an average acutance value corresponding to the main area, and detect number of noise points in the main area; and calculate to obtain a quality parameter corresponding to the picture by using the average acutance value and the number of noise points.

In the above scheme, the processing unit is further arranged to obtain a specified focus coordinate; or set a central coordinate of the picture as the focus coordinate.

In the above scheme, the calculation unit is specifically arranged to convert the average acutance value into an acutance score value, convert the number of the noise points into a noise point score value, determine a corresponding weighting factor according to the extended EXIF information, and calculate to obtain the quality parameter corresponding to the picture by using the weighting factor, the acutance score value and the noise point score value.

In the above scheme, the calculation unit is further arranged to extract a flashlight parameter in the extended EXIF, and the weighting factor is a first group of weighting factors when determining that a flashlight is not turned on according to the flashlight parameter; otherwise, the weighting factor is a second group of weighting factors.

In the above scheme, the calculation unit is further arranged to grade the picture according to the quality parameter, to obtain a grade corresponding to the picture;

accordingly, the processing unit is specifically arranged to store the quality parameter, by taking an identification of the picture as an index, into a database; or, store the quality parameter and the grade of the picture, by taking the identification of the picture as the index, into the database; and display the picture in accordance with the quality parameter or the grade of the picture when the picture is displayed.

The method for processing pictures and electronic device provided by the embodiment of the present document records the focus coordinate of the picture in the EXIF information through the extended EXIF information; it cuts out the main area of the picture by taking the focus coordinate as the center through reading the focus coordinate; and then calculates the acutance and number of noise points of the main area, and then determines the quality parameter corresponding to the picture, and it can also be stored and displayed according to the quality parameter. Obviously, the scheme provided by the present document can be adopted to quickly determine the quality of the picture, and then help the user to optimize and filter the picture, to facilitate the user to view.

SPECIFIC EMBODIMENTS

The present document is further illustrated in details through the accompanying drawings and specific embodiments.

Embodiment One

Figure 1:
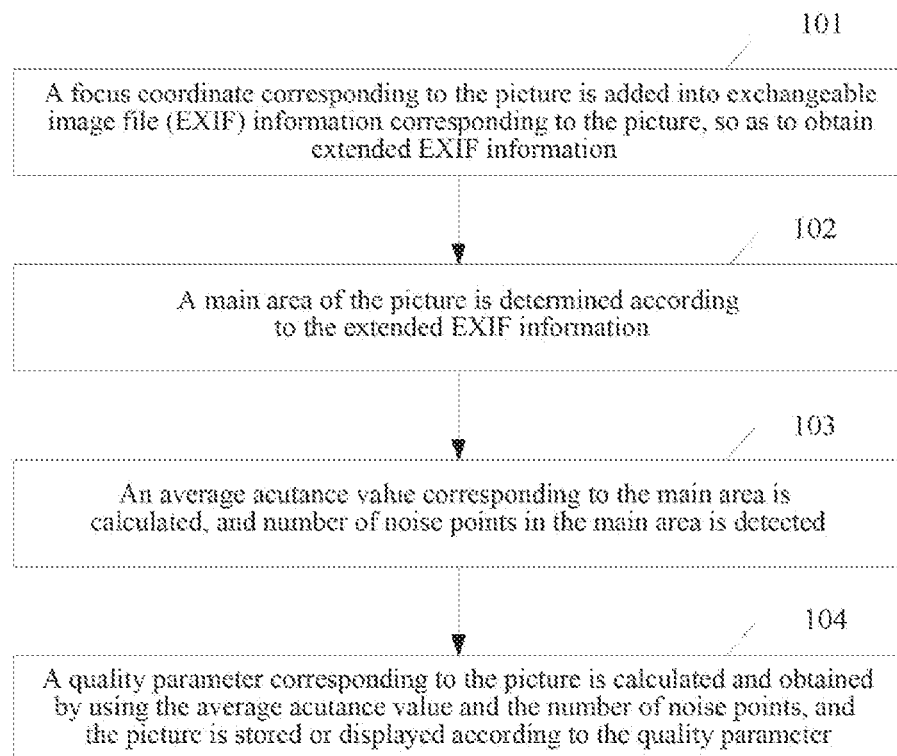
FIG. 1 is a flow chart of a picture processing method of an embodiment of the present document.

The picture processing method provided by the embodiment of the present document includes the following steps as shown in FIG. 1.

In step 101: a focus coordinate corresponding to a picture is added into exchangeable image file (EXIF) information corresponding to the picture when the picture is collected, so as to obtain extended EXIF information.

In step 102: a main area of the picture is determined according to the extended EXIF information.

In step 103: an average acutance value corresponding to the main area is calculated, and the number of noise points in the main area is detected.

In step 104: a quality parameter corresponding to the picture is calculated and obtained by using the average acutance value and the number of noise points, and the picture is stored or displayed according to the quality parameter.

Here, the collected picture can be a picture taken by a camera on an electronic device by the user, and the electronic device can be an intelligent phone, a tablet computer, or a digital camera, etc.

The adding a focus coordinate corresponding to a picture into EXIF information corresponding to the picture can include: adding the focus coordinate corresponding to the picture into the EXIF information through modifying Camera code in an HAL layer.

The default EXIF information includes: information, such as, collection time and size of the picture, whether the flashlight is turned on, etc.

The obtaining method of the focus coordinate can include: obtaining a focus coordinate specified by the user; or setting a central coordinate of the picture as the focus coordinate. Herein, the focus coordinate specified by the user can be determined by detecting the operation of the user; for example, the user can specify the focus coordinate through touching the screen when using the intelligent phones to take pictures.

Figure 2:
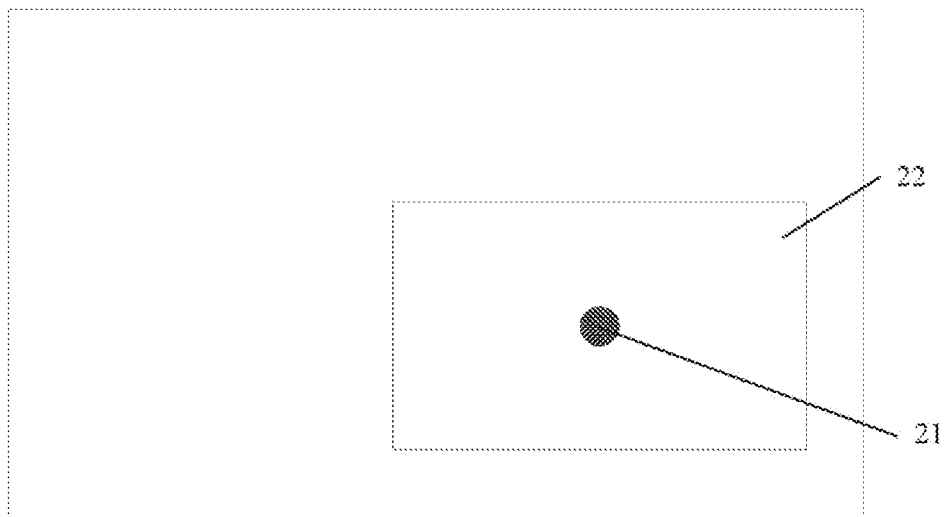
FIG. 2 is location schematic diagram one of a main area of an embodiment of the present document.

The determining a main area of the picture according to the extended EXIF information can include: when the distances between the focus coordinate and the four sides of the picture are all not less than a preset distance value, a rectangle which regards the focus coordination as the center point and of which length and width values are specified is the main area; for example, as shown in FIG. 2, the width of the original picture is recorded as W, the height is H, and the focus coordinate 21 is the center point P; taking P as the center point, the intercepted main area is a rectangle of which the specified width value is: $W1=⅓*W$ and the specified length value is: $H1=⅓*H$.

Figure 3:
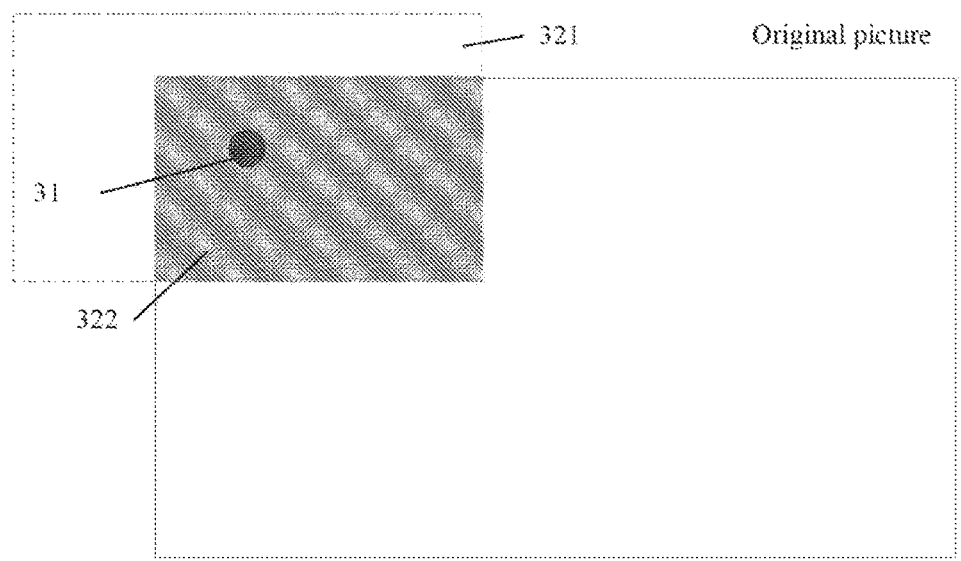
FIG. 3 is location schematic diagram two of a main area of an embodiment of the present document.

When a distance between the focus coordinate and any one of the four sides of the picture is less than the preset distance value, the rectangle which regards the focus coordination as the center point and of which the length and width values are specified is regarded as a first area, and an area overlapped by the first area and the picture is regarded as the main area; for example, as shown in FIG. 3, the focus coordinate is close to an angle of the picture, then first the focus coordinate 31 is regarded as the center point, and the rectangle of which the length and width values are specified is determined as the first area 321, that is, the area shown by the dashed box in FIG. 3; the first area can be the rectangular of which the specified width value can be $W1=⅓*W$ and the specified length value can be $H1=⅓*H$; and then the area overlapped by the first area 321 and the original picture is determined, that is, the rectangle area of which the color is darker in FIG. 3 is regarded as the main area 322.

Figure 4:
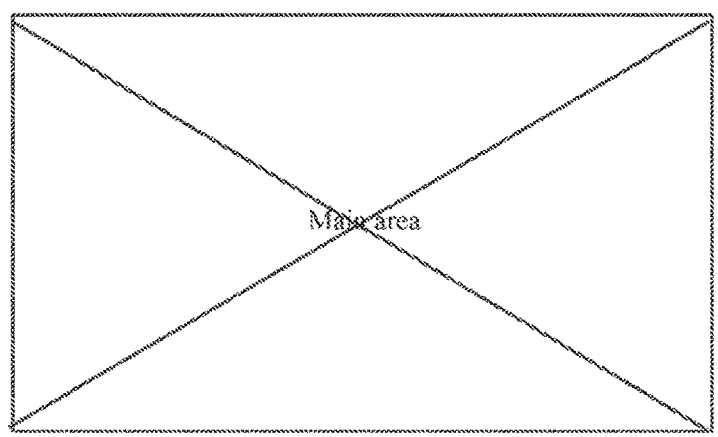
FIG. 4 is a schematic diagram of determining an acutance value of the picture in an embodiment of the present document.

Alternatively, the calculating the average acutance value corresponding to the main area can include: calculating acutance values corresponding to four sides and two diagonals of the main area respectively by using an edge acutance algorithm, and calculating to obtain the average acutance value. As shown in FIG. 4, specifically, it is to select the four sides and two diagonals of the main area for calculation; calculate grayscale change values on the four sides and two diagonals of the picture respectively; herein, the grayscale change values are regarded as the acutance values, while the severer the grayscale changes, then the picture is more clear; and then average the acutance values of the four sides and two diagonals as the acutance value of the main area. The acutance is sharpness of the picture, and it is an important indicator to measure image resolution.

The calculation formula of calculating the grayscale change values of the image on the four sides and the two diagonals is as follows:

$$E = \frac{\sum_{a}^{b}(d_f/d_x)^2}{|f(b)-f(a)|}$$

herein, $d_f/d_x$ is a grayscale change rate in the edge direction, f(b)-f(a) is an overall change in that direction, herein, a and b represent two endpoints of the currently calculated line respectively; for example, if a diagonal is calculated, a and b respectively are the two endpoints of the diagonal.

Figure 5:
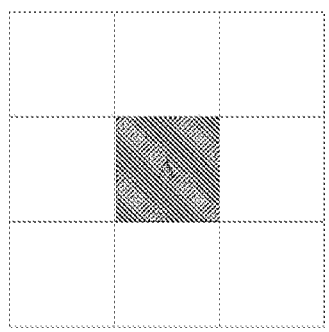
FIG. 5 is a schematic diagram of detecting noise points in an embodiment of the present document.

A picture noise point refers to a certain point of which a pixel value makes a great difference with ones around, and it is also a factor to measure picture quality. Referring to FIG. 5, the more the number of the noise points is, the less the score is. If a pixel point A has large differences with pixel values of 8 neighboring areas around, then it is judged as the noise point, and the detection of the edge point is ignored during the detection of noise point.

The formula of detecting the number of the noise points is as follows:

$$L_p(c) = \sum_{k=1}^{N} |x_k(c) - x_o(c)|$$

herein, $L_p(c)$ is a vector sum of the noise points, and c is 8 neighboring areas around the center point A; $X_O(c)$ represents the grayscale value of the center pixel, and $X_K(c)$ represents the neighboring area pixel points around the center point A, herein, N=8. If $L_p(c)$ is greater than a preset determination threshold, then that center point is determined as a noise point. It is represented that the less the number of the noise points of the picture is, more beautiful the picture is and higher the quality is.

The calculating to obtain the quality parameter corresponding to the picture by using the average acutance value and the number of noise points can include: converting the average acutance value into an acutance score value, converting the number of the noise points into a noise point score value, determining a corresponding weighting factor according to the extended EXIF information, and calculating to obtain the quality parameter corresponding to the picture by using the weighting factor, the acutance score value and the noise point score value. For example, the acutance score is S1, the noise point score is S2, the corresponding weighting factor of the acutance score value is correspondingly a and that of the noise score value is correspondingly b, then the final score of the picture is recorded as S=a*S1+b*S2.

Herein, the converting the average acutance value into the acutance score value can be that: after a large number of picture are simulated, if the acutance value is in an interval [1100, 1200], then it is determined as 5 scores; determined as 4 scores if it is in the interval [1000, 1100], determined as 3 scores if it is in the interval [900, 1000], determined as 2 scores if it is in the interval [700, 900], and determined as 1 score if the acutance is lower than 700.

The converting the number of the noise points into the noise point score value can include that: if the number of the noise points in the main area is in [0,10], then it is determined as 5 scores, and determined as 4 scores if it is in [11, 20], determined as 3 scores if it is in [21,35], determined as 2 if it is in [36,45], and determined as 1 score if the number of the noise points is more than 45.

Herein, the determining the corresponding weighting factor according to the extended EXIF information can include: extracting a flashlight parameter (TAG_FLASH) in the extended EXIF, and the weighting factor being a first group of weighting factors when determining that a flashlight is not turned on according to the flashlight parameter; otherwise, the weighting factor being a second group of weighting factors; for example, the flashlight is not turned on if it is 0; and the flashlight is turned on if it is 1; if the flashlight is not turned on, then the first group of weighting factors are determined as a=0.6, and b=0.4; if the flashlight is turned on, compared with the normal situation, the photos are more prone to be with the problem of noise points, then the second group of weighting factors are: a=0.4 and b=0.6.

Alternatively, it can further include grading the picture according to the quality parameter, to obtain the corresponding grade of the picture; for example, the quality parameter score interval [4.5, 5] is determined as excellent, the interval [3.5, 4.4] is determined as good, [2.5, 3.4] is determined as general, and [1, 2.4] is determined as poor.

The storing the picture according to the quality parameter can be: storing the quality parameter, by taking an identification of the picture as an index, into a database; or, store the quality parameter and the grade of the picture into the database; herein, the identification of the picture can be the name of the picture, or the shooting time of the picture, etc.

The displaying the picture according to the quality parameter can be: displaying the picture in accordance with the quality parameter or the grade of the picture when the picture is displayed. For example, when the user opens the gallery and needs to browse the pictures, the user can grade and display all pictures in the database to the user for browsing according to the result required to be obtained by grading as per the quality parameter.

Further, the user can further perform the operations, such as, filtering, deleting, etc., on the picture according to the grade of the picture, when the picture is displayed.

Figure 6:
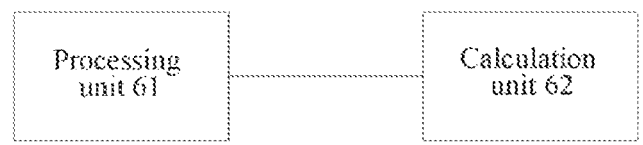
FIG. 6 is a composition structure diagram of an electronic device of an embodiment of the present document.

Embodiment Two the electronic device provided by the embodiment of the present document includes the following steps as shown in FIG. 6, including:

a processing unit 61, arranged to: add a focus coordinate corresponding to a picture into exchangeable image file (EXIF) information corresponding to the picture when the picture is collected, so as to obtain extended EXIF information; and determine a main area of the picture according to the extended EXIF information;

a calculation unit 62, arranged to: calculate an average acutance value corresponding to the main area, and detect number of noise points in the main area; and calculate to obtain a quality parameter corresponding to the picture by using the average acutance value and the number of noise points, and store or display the picture according to the quality parameter.

Here, the electronic device can be an intelligent phone, a tablet computer, or a digital camera, etc.

The processing unit 61 is specifically used for adding the focus coordinate corresponding to the picture into the EXIF information through modifying Camera code in an HAL layer.

The default EXIF information includes: information, such as, collection time and size of the picture, whether the flashlight is turned on, etc.

The processing unit 61 is further used for obtaining a focus coordinate specified by the user; or setting a central coordinate of the picture as the focus coordinate.

The processing unit 61 is further used for, when the distances between the focus coordinate and the four sides of the picture are all not less than a preset distance value, making a rectangle which regards the focus coordination as the center point and of which length and width values are specified as the main area; for example, as shown in FIG. 2, the width of the original picture is recorded as W, the height is H, and the focus coordinate 21 is the center point P; taking P as the center point, the intercepted main area is a rectangle of which the specified width value is: W1=⅓*W and the specified length value is: H1=⅓*H;

When a distance between the focus coordinate and any one of the four sides of the picture is less than the preset distance value, the rectangle which regards the focus coordination as the center point and of which the length and width values are specified is regarded as a first area, and an area overlapped by the first area and the picture is regarded as the main area; for example, as shown in FIG. 3, the focus coordinate is close to an angle of the picture, then first the focus coordinate 31 is regarded as the center point, and the rectangle of which the length and width values are specified is determined as the first area 321, that is, the area shown by the dashed box in FIG. 3; the first area can be the rectangular of which the specified width value can be W1=⅓*W and the specified length value can be H1=⅓*H; and then the area overlapped by the first area 321 and the original picture is determined, that is, the rectangle area of which the color is darker in FIG. 3 is regarded as the main area 322.

Alternatively, the calculation unit 62 is further used for calculating acutance values corresponding to four sides and two diagonals of the main area respectively by using an edge acutance algorithm, and calculating to obtain the average acutance value; as shown in FIG. 4, specifically, selecting the four sides and two diagonals of the main area for calculation; calculating grayscale change values on the four sides and two diagonals of the picture respectively; herein, the grayscale change values are regarded as the acutance values, while the severer the grayscale changes, then the picture is more clear; and then the averaging the acutance values of the four sides and two diagonals as the acutance value of the main area. The acutance is sharpness of the picture, and it is an important indicator to measure image resolution.

The calculation formula of calculating the grayscale change values of the image on the four sides and the two diagonals is as follows:

$$E = \frac{\sum_{a}^{b}(d_f/d_x)^2}{|f(b)-f(a)|}$$

herein, $d_f/d_x$ is a grayscale change rate in the edge direction, f(b)-f(a) is an overall change in that direction, herein, a and b represent two endpoints of the currently calculated line respectively; for example, if a diagonal is calculated, a and b respectively are the two endpoints of the diagonal.

A picture noise point refers to a certain point of which a pixel value makes a great difference with ones around, and it is also a factor to measure picture quality. Referring to FIG. 5, the more the number of the noise points is, the less the score is. If a pixel point A has large differences with pixel values of 8 neighboring areas around, then it is judged as the noise point, and the detection of the edge point is ignored during the detection of noise points.

The formula of detecting the number of the noise points is as follows:

$$L_p(c) = \sum_{k=1}^{N}|x_k(c) - x_o(c)|$$

herein, $L_p(c)$ is a vector sum of the noise points, and c is 8 neighboring areas around the center point A; $X_O(c)$ represents the grayscale value of the center pixel, and $X_K(c)$ represents the neighboring area pixel points around the center point A, herein, N=8. If $L_p(c)$ is greater than a preset determination threshold, then that center point is determined as a noise point. It is represented that the less the number of the noise points of the picture is, more beautiful the picture is and higher the quality is.

The calculation unit 62 is further used for converting the average acutance value into an acutance score value, converting the number of the noise points into a noise point score value, determining a corresponding weighting factor according to the extended EXIF information, and calculating to obtain the quality parameter corresponding to the picture by using the weighting factor, the acutance score value and the noise point score value. For example, the acutance score is S1, the noise point score is S2, the corresponding weighting factor of the acutance score value is correspondingly a and that of the noise score value is correspondingly b, then the final score of the picture is recorded as S=a*S1+b*S2.

Herein, the converting the average acutance value into the acutance score value can be that: after a large number of picture are simulated, if the acutance value is in an interval [1100, 1200], then it is determined as 5 scores; determined as 4 scores if it is in the interval [1000, 1100], determined as 3 scores if it is in the interval [900, 1000], determined as 2 scores if it is in the interval [700, 900], and determined as 1 score if the acutance is lower than 700.

The calculation unit 62 is further used for, if the number of the noise points in the main area is in [0,10], then determining as 5 scores, and determining as 4 scores if it is in [11, 20], determining as 3 scores if it is in [21,35], determining as 2 if it is in [36,45], and determining as 1 score if the number of the noise points is more than 45.

Herein, the calculation unit 62 is further used for extracting a flashlight parameter (TAG_FLASH) in the extended EXIF, and the weighting factor being a first group of weighting factors when determining that a flashlight is not turned on according to the flashlight parameter; otherwise, the weighting factor being a second group of weighting factors; for example, the flashlight is not turned on if it is 0; and the flashlight is turned on if it is 1; if the flashlight is not turned on, then the first group of weighting factors are determined as a=0.6, and b=0.4; if the flashlight is turned on, compared with the normal situation, the photos are more prone to be with the problem of noise points, then the second group of weighting factors are: a=0.4 and b=0.6.

Alternatively, the calculation unit 62 is further used for grading the picture according to the quality parameter, to obtain the corresponding grade of the picture; for example, the quality parameter score interval [4.5, 5] is determined as excellent, the interval [3.5, 4.4] is determined as good, [2.5, 3.4] is determined as general, and [1, 2.4] is determined as poor.

The calculation unit 62 is further used for grading the picture according to the quality parameter, to obtain a grade corresponding to the picture; accordingly, the processing unit is specifically used for storing the quality parameter, by taking an identification of the picture as an index, into a database; or, storing the quality parameter and the grade of the picture, by taking the identification of the picture as the index, into the database; and displaying the picture in accordance with the quality parameter or the grade of the picture when the picture is displayed.

The storing the picture according to the quality parameter can be: storing the quality parameter, by taking an identification of the picture as an index, into a database; or, storing the quality parameter and the grade of the picture into the database; herein, the identification of the picture can be the name of the picture, or the shooting time of the picture, etc.

The displaying the picture according to the quality parameter can be: displaying the picture in accordance with the quality parameter or the grade of the picture when the picture is displayed. For example, when the user opens the gallery and needs to browse the pictures, the user can grade and display all pictures in the database to the user for browsing according to the result required to be obtained by grading as per the quality parameter. Further, the user can further perform the operations, such as, filtering, deleting, etc., on the picture according to the grade of the picture, when the picture is displayed.

In several embodiments provided in the present application, it should be understood that the disclosed device and method can be implemented in other ways. The device embodiments described above are only illustrative, for example, the division of the unit is only a division of logical functions, which may have other division mode during the actual implementation, for example: multiple units or components can be combined, or can be integrated into another system, or some features can be ignored, or not to be performed. In addition, the mutual coupling, or direct coupling or communication connection among various displayed or discussed components can be through some interfaces; indirect coupling or communication connection among devices or units can be electrical, mechanical, or other forms.

The above units as the separated components can be or can be not separated physically, and the components as the display units can be or can be not physical units, that is, they can be located in one place and also can be distributed to multiple network units; part or all units therein can be selected according to the actual requirements, to achieve the purpose of the scheme of the present embodiment.

In addition, various functional units in the embodiment of the present document can be all integrated in one processing unit, and every unit also can be separately as one unit, and two or more than two units also can be integrated in one unit; the integrated unit can be realized in the form of hardware, and also can be realized by a functional unit with hardware and software.

Those skilled in the art can understand that: all or part of the steps to achieve the above method embodiment can be completed through a program instructing the related hardware, and the previous program can be stored in a computer readable storage medium, and the steps including the above method embodiment are executed when the program is executed; and the aforementioned storage medium includes: all kinds of storage medium which can store the program code, such as, mobile storage device, read-only memory (ROM), random access memory (RAM), disk or compact disk, etc.

Alternatively, when the above integrated units of the present document are realized in the form of software functional module and are sold or used as an independent product, they may be stored in a computer readable storage medium. Based on that understanding, the essence of the technical scheme of the embodiment of the present document or the parts contributed to the existing technology can be reflected in the form of software product, and the computer software product is stored in a storage medium including a plurality of instructions to enable the computer device (which can be a personal computer, a server, or a network device) to execute all or part of the methods in various embodiments of the present document. And the aforementioned storage medium includes: all kinds of storage medium which can store the program code, such as, mobile storage device, read-only memory (ROM), random access memory (RAM), disk or compact disk, etc.

The above description is only the specific embodiment of the present document and is not intended to limit the protection scope of the present document. Those modifications and replacements which can be thought out easily by those skilled in the art in the technical scope disclosed by the present document should be embodied in the protection scope of the present document. Therefore, the protection scope of the present document should be based on the protection scope described by the claims.

INDUSTRIAL APPLICABILITY

The present document discloses a method for processing pictures and electronic device, which records the focus coordinate of the picture in the EXIF information through the extended EXIF information; it cuts out the main area of the picture by taking the focus coordinate as the center through reading the focus coordinate; and then calculates the acutance and number of noise points of the main area, and then determines the quality parameter corresponding to the picture, and it can also be stored and displayed according to the quality parameter. Obviously, the scheme provided by the present document can be adopted to quickly determine the quality of the picture, and then help the user to optimize and filter the picture, to facilitate the user to view.

I claim:

1. A method for processing pictures, comprising:
    adding a focus coordinate corresponding to a picture into exchangeable image file, EXIF, information corresponding to the picture when the picture is collected, to obtain extended EXIF information;
    determining a main area of the picture according to the extended EXIF information;
    calculating an average acutance value corresponding to the main area, and detecting number of noise points in the main area; and
    calculating to obtain a quality parameter corresponding to the picture by using the average acutance value and the number of noise points, and storing or displaying the picture according to the quality parameter,
    wherein, said calculating to obtain the quality parameter corresponding to the picture by using the average acutance value and the number of noise points comprises:
    converting the average acutance value into an acutance score value, converting the number of the noise points into a noise point score value, determining a corresponding weighting factor according to the extended EXIF information, and calculating to obtain the quality parameter corresponding to the picture by using the weighting factor, the acutance score value and the noise point score value, said determining a corresponding weighting factor according to the extended EXIF information comprises: extracting a flashlight parameter in the extended EXIF, and the weighting factor being a first group of weighting factors when determining that a flashlight is not turned on according to the flashlight parameter; otherwise, the weighting factor being a second group of weighting factors.

2. The method according to claim 1, further comprising: obtaining a specified focus coordinate; or setting a central coordinate of the picture as the focus coordinate.

3. The method according to claim 2, further comprising: grading the picture according to the quality parameter, to obtain a grade corresponding to the. picture;

accordingly, storing the picture according to the quality parameter being that: storing the quality parameter, by taking an identification of the picture as an index, into a database; or, storing the quality parameter and the grade of the picture, by taking the identification of the picture as the index, into the database; and said displaying the picture according to the quality parameter being that: displaying the picture in accordance with the quality parameter or the grade of the picture when the picture is displayed.

4. The method according to claim 1, further comprising: grading the picture according to the quality parameter, to obtain a grade corresponding to the picture;

accordingly, storing the picture according to the quality parameter being that: storing the quality parameter, by taking an identification of the picture as an index, into a database; or, storing the quality parameter and the grade of the picture, by taking the identification of the picture as the index, into the database; and said displaying the picture according to the quality parameter being that: displaying the picture in accordance with the quality parameter or the grade of the picture when the picture is displayed.

5. An electronic device, comprising:

a processing circuit, arranged to: add a focus coordinate corresponding to a picture into exchangeable image file, EXIF, information corresponding to the picture when the picture is collected, to obtain extended EXIF information; determine a main area of the picture according to the extended EXIF information; and storing or displaying the picture according to a quality parameter;

a calculation circuit, arranged to: calculate an average acutance value corresponding to the main area, and detect number of noise points in the main area; and calculate to obtain the quality parameter corresponding to the picture by using the average acutance value and the number of noise points, wherein, the calculation circuit is arranged to convert the average acutance value into an acutance score value, convert the number of the noise points into a noise point score value, determine a corresponding weighting factor according to the extended EXIF information, and calculate to obtain the Quality parameter corresponding to the picture by using the weighting factor, the acutance score value and the noise point score value, the calculation circuit is arranged to extract a flashlight parameter in the extended EXIF, and the weighting factor is a first group of weighting factors when determining that a flashlight is not turned on according to the flashlight parameter; otherwise, the weighting factor is a second group of weighting factors.

6. The electronic device according to claim 5, wherein, the processing circuit is arranged to obtain a specified focus coordinate; or set a central coordinate of the picture as the focus coordinate.

7. The electronic device according to claim 6, wherein, the calculation circuit is arranged to grade the picture according to the quality parameter, to obtain a grade corresponding to the picture;

accordingly, the processing circuit is arranged to store the quality parameter, by taking an identification of the picture as an index, into a database; or, store the quality parameter and the grade of the picture, by taking the identification of the picture as the index, into the database; and display the picture in accordance with the quality parameter or the grade of the picture when the picture is displayed.

8. The electronic device according to claim 5, wherein, the calculation circuit is arranged to grade the picture according to the quality parameter, to obtain a grade corresponding to the picture;

accordingly, the processing circuit is arranged to store the quality parameter, by taking an identification of the picture as an index, into a database; or, store the quality parameter and the grade of the picture, by taking the identification of the picture as the index, into the database; and display the picture in accordance with the quality parameter or the grade of the picture when the picture is displayed.

* * * * *